(12) United States Patent
Strasser et al.

(10) Patent No.: US 9,623,748 B2
(45) Date of Patent: Apr. 18, 2017

(54) METHOD AND SYSTEM FOR OPERATING A DRIVE TRAIN OF A MOTOR VEHICLE

(71) Applicant: Audi AG, Ingolstadt (DE)

(72) Inventors: Sebastian Strasser, Ingolstadt (DE); Michael Bär, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 236 days.

(21) Appl. No.: 14/438,113

(22) PCT Filed: Oct. 18, 2013

(86) PCT No.: PCT/EP2013/003143
§ 371 (c)(1),
(2) Date: Apr. 23, 2015

(87) PCT Pub. No.: WO2014/063800
PCT Pub. Date: May 1, 2014

(65) Prior Publication Data
US 2015/0291027 A1  Oct. 15, 2015

(30) Foreign Application Priority Data
Oct. 24, 2012 (DE) .................... 10 2012 020 906

(51) Int. Cl.
*G06F 7/00* (2006.01)
*B60K 23/08* (2006.01)

(52) U.S. Cl.
CPC ...... *B60K 23/08* (2013.01); *B60K 2023/0858* (2013.01); *B60W 2520/14* (2013.01); *B60W 2520/26* (2013.01); *F16D 2500/5075* (2013.01)

(58) Field of Classification Search
CPC ........... B60K 23/08; B60K 2023/0858; B60W 2520/14; B60W 2520/26; F16D 2500/5075
See application file for complete search history.

(56) References Cited

U.S. PATENT DOCUMENTS

| 4,556,134 A | 12/1985 | Takano |
| 4,562,541 A | 12/1985 | Sakaiyama |
| 4,872,525 A | 10/1989 | Sommer |

(Continued)

FOREIGN PATENT DOCUMENTS

| CN | 1413853 A | 4/2003 |
| CN | 101410269 A | 4/2009 |

(Continued)

OTHER PUBLICATIONS

Chinese Search Report issued by the Chinese Patent Office in Chinese Application No. 201380055528.2 on Aug. 9, 2016.

(Continued)

*Primary Examiner* — David J Hlavka
(74) *Attorney, Agent, or Firm* — Henry M. Feiereisen LLC

(57) ABSTRACT

A method for operating a drive train of a motor vehicle includes the steps: detecting at least one variable; quantifying and/or influencing a movement of the motor vehicle; depending on the variable, switching on an all-wheel drive of the motor vehicle; wherein it is estimated on the basis of the at least one variable whether a relevant driving situation is impending and in this case the all-wheel-drive is switched on before occurrence of the relevant driving situation. A system for operating a drive train of a motor vehicle is also disclosed.

26 Claims, 5 Drawing Sheets

(56) References Cited

U.S. PATENT DOCUMENTS

| | | | |
|---|---|---|---|
| 6,101,439 A | 8/2000 | Cutting et al. | |
| 6,219,609 B1 | 4/2001 | Matsuno et al. | |
| 8,396,633 B2 | 3/2013 | Buszek et al. | |
| 8,645,026 B2 | 2/2014 | Bär et al. | |
| 8,649,929 B2 | 2/2014 | Strasser | |
| 2005/0179580 A1* | 8/2005 | Cong | B60K 31/0008 342/70 |
| 2005/0251323 A1* | 11/2005 | Heinrichs-Bartscher | B60K 31/0008 701/117 |
| 2010/0082215 A1* | 4/2010 | Miyajima | B60W 10/08 701/93 |
| 2010/0094519 A1 | 4/2010 | Quehenberger et al. | |
| 2010/0250056 A1 | 9/2010 | Perkins | |
| 2010/0262326 A1 | 10/2010 | Buszek et al. | |
| 2012/0323446 A1 | 12/2012 | Bär et al. | |
| 2013/0030602 A1* | 1/2013 | Joeng | B60W 30/12 701/1 |
| 2013/0041545 A1 | 2/2013 | Bär et al. | |
| 2013/0090840 A1 | 4/2013 | Bär | |
| 2013/0218398 A1* | 8/2013 | Gandhi | B60R 16/02 701/31.1 |
| 2013/0218414 A1 | 8/2013 | Meitinger et al. | |
| 2013/0325232 A1 | 12/2013 | Strasser | |
| 2014/0005892 A1 | 1/2014 | Bär et al. | |
| 2015/0251662 A1* | 9/2015 | Nakayama | B60W 30/18145 701/400 |
| 2015/0274163 A1* | 10/2015 | Terazawa | B60W 10/20 701/41 |
| 2016/0251014 A1* | 9/2016 | Tomiyama | B60W 30/143 701/96 |
| 2016/0288787 A1* | 10/2016 | Kraehling | B60W 30/0953 |

FOREIGN PATENT DOCUMENTS

| | | |
|---|---|---|
| DE | 33 02 936 | 8/1983 |
| DE | 33 12 694 | 11/1983 |
| DE | 38 38 709 | 6/1989 |
| DE | 196 00 734 | 7/1997 |
| DE | 198 38 169 | 3/1999 |
| DE | 698 34 162 | 3/2007 |
| DE | 102009005378 | 4/2010 |
| DE | 102010013007 | 10/2010 |
| GB | 2488241 | 8/2012 |
| GB | 2488410 | 8/2012 |
| JP | 08268102 | 10/1996 |

OTHER PUBLICATIONS

English translation of Chinese Search Report issued by the Chinese Patent Office in Chinese Application No. 201380055528.2 on Aug. 9, 2016.

International Search Report issued by the European Patent Office in International Application PCT/EP2013/003143 on Jan. 16, 2014.

* cited by examiner

METHOD AND SYSTEM FOR OPERATING A DRIVE TRAIN OF A MOTOR VEHICLE

CROSS-REFERENCES TO RELATED APPLICATIONS

This application is the U.S. National Stage of International Application No. PCT/EP2013/003143, filed Oct. 18, 2013, which designated the United States and has been published as International Publication No. WO 2014/063800 and which claims the priority of German Patent Application, Serial No. 10 2012 020 906.1, filed Oct. 24, 2012, pursuant to 35 U.S.C. 119(a)-(d).

BACKGROUND OF THE INVENTION

The invention relates to a method for operating a drive train of a motor vehicle and a system for operating a drive train of a motor vehicle of a type described in the preambles of the independent claims.

Such a method is known for example from DE 3312694 A1. For operating a drive train of a motor vehicle, at least one variable quantifying and/or influencing a movement of the motor vehicle is detected and an all-wheel drive of the motor vehicle is switched on as a function of the variable.

DE 3302936 A1 also shows such a method for operating a drive train of a motor vehicle, wherein at least one variable quantifying and/or influencing a movement of the motor vehicle is detected and an all-wheel drive of the motor vehicle is activated depending on this variable.

The U.S. Pat. No. 6,101,439 shows a method for operating of a transfer case for an all-wheel drive vehicle.

DE 19600734 C2 shows a method wherein data for a driving environment of a motor vehicle and data for determining the position of the motor vehicle as well as data revealing a driving condition of the motor vehicle are linked and used for a combined control of a motor control, a transmission control, an all-wheel drive, one or more differential locks, an ABS, a chassis, a steering system or the like.

SUMMARY OF THE INVENTION

It is the object of the present invention to provide a method and a system for operating a drive train of a motor vehicle of the aforementioned type, with which an all-wheel drive of an automobile can be used in an improved manner.

This object is attained by a method and a system for operating a drive train of a motor vehicle having the features of the independent claims. Advantageous embodiments with useful and non-trivial developments of the invention are set forth in the dependent claims.

In a method according to the invention for operating a drive train of a motor vehicle, at least one variable quantifying and/or influencing a movement of the motor vehicle is detected and an all-wheel drive of the motor vehicle is switched on depending on the variable, wherein the method of the invention is characterized in that it is estimated based on the at least one variable whether a relevant driving situation is imminent, and the all-wheel drive is only in this case switched on prior to the occurrence of the relevant situation. In other words, it is monitored based on the at least one variable quantifying and/or influencing the movement of the motor vehicle whether to expect a relevant driving situation, wherein the all-wheel drive is in this case timely switched on only before the relevant situation can occur. A relevant situation refers to, for example, a wheel slip occurring at the permanently driven primary axle, understeer or oversteer and the like. This list of examples is not meant to be exhaustive.

In general, a relevant driving situation refers to driving situations wherein a deviation between an actual driving behavior of the motor vehicle and a driving behavior predetermined or desired by driver is expected, wherein in an extreme case, a limit region of the motor vehicle is exceeded so that a loss of control of the motor vehicle by a driver is to be expected. A relevant driving situation also refers to every driving situation where a different driving behavior between an axle drive and an all-wheel drive exists that can be resolved by the driver. This includes not only driving-safety-relevant situations, but also driving-dynamics-relevant and comfort-relevant driving situations.

According to the invention, the all-wheel drive of the motor vehicle, i.e. the not yet driven secondary axle of the motor vehicle, may be switched on before such a relevant driving situation occurs, so that the driving dynamics of the motor vehicle can be further improved by switching on the all-wheel drive even before the actual relevant driving situation occurs. A driving situation that is estimated to be relevant with exclusively a two-wheel drive may thus no longer be a relevant driving situation after the all-wheel drive is switched on, since the driving dynamics of the motor vehicle can be improved due to the additionally driven wheels of the secondary axle.

In particular, the all-wheel drive of the motor vehicle is switched on early enough so that the driving behavior of the motor vehicle is sufficiently improved, even before an dynamics control system, for example an electronic stability control, traction control and the like, intervenes so that depending on the situation no intervention or a significantly reduced intervention of a vehicle dynamics control will be required. The driving behavior of the motor vehicle can be improved, with correspondingly increased safety reserves, by anticipatorily switching on the all-wheel drive of the motor vehicle when needed.

Moreover, corresponding fuel savings are attained by switching on the all-wheel drive only when absolutely necessary. Furthermore, by timely switching on the all-wheel drive, the drive train can be appropriately synchronized so as to be comfortable and hardly noticeable, for example, through synchronization with the wheel rotation speed and by closing a yaw clutch. With the method according to the invention, which represents an operating strategy, a control deviation, for example in the form of spinning front wheels at full throttle acceleration or very fast cornering, is no longer required first for switching on a rear axle and an additional selectable secondary axle. Significant fuel savings can therefore be achieved without having to accept an excessively large loss in traction or driving dynamics.

According to an advantageous embodiment of the invention, it may be checked for estimating whether a relevant driving situation is imminent, whether a torque to be applied to a permanently driven primary axle of the motor vehicle is greater than a maximum torque that can be transferred to the roadway at the primary axle, and if this is the case, it is estimated whether a driver will demand such a large portion of the available torque wherein this portion is greater than the transferable torque, and if this is the case, the all-wheel drive is switched on. Preferably, the maximum torque transferable to the roadway at the primary axle is hereby determined based on a coefficient of friction, a respective wheel load acting on the wheels on the primary axle and a respective lateral force acting on the wheels of the primary axle. Preferably, to determine the coefficient of friction, both information about the immediate road conditions and the road conditions in front of the motor vehicle in the direction of travel as well as information about the tires of the motor vehicle may be included. In other words, the relevant driving situation is in this case estimated as to whether one or both of the wheels of the driven primary axle can be to expected to spin, by checking on the one hand whether the potentially available torque on the primary axle exceeds the torque transferable to the road surface, whereafter it is estimated whether the available torque is retrieved by a particular driver type. Thus, there is a forward-looking assessment as to whether a loss of traction can be expected on the primary axle, wherein if this is the case, the all-wheel drive or the not yet driven secondary axle is switched on for timely improving the traction of the motor vehicle. This will then anticipatorily and timely ensure that even before the wheels of the driven primary axle can spin, the secondary axle is timely switched on, thereby improving traction of the motor vehicle.

According to another advantageous embodiment of the invention, it may be checked based on a lateral acceleration, target yaw rate and/or speed of the motor vehicle in combination with an estimate of the driving behavior of the driver, whether to expect a relevant driving situation, and if this is the case, whereafter the all-wheel drive is switched on. In other words, this is not a traction pilot control, as previously explained, but instead an agility pilot control capable of improving the properties of the motor vehicle in relation to its transverse dynamics by timely switching on an all-wheel drive. The driving situation is evaluated based on the lateral acceleration, the target yaw rate and/or the speed of the motor vehicle and the future driving situation is extrapolated, while the driving behavior of the driver is at the same time estimated depending on the driver type, so that relevant driving situations, for example in the form of understeer, oversteer or optionally other undesirable driving situations of the motor vehicle can be estimated early on, which would occur with a pure two-wheel drive, so that all-wheel drive is timely switched on to avoid these relevant driving situation.

According to another advantageous embodiment of the invention, the driving behavior of the driver may be estimated by taking into account an activated mode of operation of the motor vehicle that influences the driving dynamics of the motor vehicle. The motor vehicle may for example have a driving dynamics system with which a driver can adjust the characteristics of respective components of the motor vehicle, such as engine, transmission, steering, damping, differential gears and the like, to his personal preferences. Different modes affecting the dynamics of the motor vehicle may be preselected, for example in the form of a particularly comfortable suspension, a particularly sporty suspension or an automatic mode that adjusts, for example, the aforementioned components of the motor vehicle according to the driving behavior of the driver as needed. Depending on the preselected mode of operation, a relationship between the selected mode of operation and the driving behavior of the driver is therefore assumed when estimating of the driving behavior of the driver, according to which the driving behavior of the driver is estimated.

According to another advantageous embodiment of the invention, the estimated driving behavior of the driver and the actual driving behavior of the driver are continuously compared and used for estimating the driving behavior of the driver. In other words, a continuous learning system is provided which continuously compares the assumed driving behavior of the driver depending on the driving situation and the actual driving behavior of the driver in order to better and thus more accurately estimate future driving behaviors. For example, variables characterizing the driving behavior of the driver such as a retrieved engine torque, yaw rates, vehicle speeds, and the like can be used, wherein in each case the ratio between the actually measured values and the previously predicted values is formed and then integrated over time in order to continuously improve and adapt the prediction of the driving behavior. In particular, different driver profiles, for example, by an appropriate recognition of different drivers based on their used respective individual vehicle keys or the like may be created and the estimates of the driving behavior for the different driver profiles may be continuously improved.

According to a preferred embodiment of the invention, it may be determined whether a threshold value set as a function of the activated mode of operation influencing the driving dynamics of the motor vehicle for a slip on one of the wheels of the permanently driven primary axle of the motor vehicle is exceeded, and if this is the case, the all-wheel drive is switched on. In other words, this is therefore not a traction pilot control, but instead a traction control by which the all-wheel drive is switched on, if a relevant driving situation in form of an unwanted slip on one of the wheels of the permanently driven primary axle of the motor vehicle should nevertheless occur. The threshold for the allowable slip on one or on all wheels of the permanently driven primary axle of the motor vehicle is hereby predetermined as a function of the activated mode of operation that influences the driving dynamics of the motor vehicle, because it may optionally even be desirable depending on the selected mode of operation to allow some slip on one of the wheels or on all wheels, for example, to allow a slight drift of the motor vehicle in a sport mode. This traction control has the advantage that if, for example, the all-wheel drive is not timely switched on by the traction pilot control, for example, due to an erroneous estimate of the future driving behavior of the driver, a kind of fallback solution is still available for improving the driving dynamics of the motor vehicle by switching on the all-wheel drive.

According to another advantageous embodiment of the invention, it may be determined whether a respective threshold value that is predetermined as a function of the activated mode of operation influencing the driving dynamics of the motor vehicle for oversteer and understeer of the motor vehicle is exceeded and, if this is the case, the all-wheel drive is switched on. Especially with respect to the lateral dynamics of the motor vehicle, this is a stability control system that intervenes when detecting a relevant driving situation in the form of an undesirable oversteer or understeer of the motor vehicle. If in the anticipatory driving dynamics pilot control, for example, an all-wheel drive was not switched on due to an erroneous assessment of the driving behavior of the driver, which then resulted in an undesirable oversteer or understeer of the motor vehicle, this is essentially recognized immediately, so that by switching on the all-wheel drive, the unwanted oversteer or understeer can be very quickly remedied or prevented by the correspondingly improved driving dynamics of the motor vehicle due to the additional drivable wheels the switched-in secondary axle.

According to another advantageous embodiment of the invention, after the all-wheel drive has been switched on, it is determined based on the at least one variable and/or variables quantifying and/or influencing the movement of the motor vehicle whether switching off the all-wheel drive would result in a relevant driving situation, and if this is not the case, the all-wheel drive is switched off after a predetermined holding period. Preferably, it is checked quasi permanently whether completely switching off the all-wheel drive, i.e. by solely driving the permanently driven primary axle, would lead to a relevant driving situation. If this is not the case, the all-wheel drive is switched off again after the defined holding period, thus allowing a highly energy-efficient operation of the motor vehicle by using the all-wheel drive according to demand.

According to another advantageous embodiment of the invention, the holding period may be predetermined as a function of the respective activated mode of operation affecting the driving dynamics of the motor vehicle and/or by the estimated driving behavior of the driver. In other words, a prohibition of limited duration against a switch-off may be preset so that the all-wheel drive, after having been switching on, cannot be switched off again immediately, but only after the specified duration of the switch-off-prohibition has elapsed. This prevents in particular the secondary axle, i.e. the all-wheel drive, from being unintentionally and continuously switched on and switched off. In addition, certain safety margins can be ensured by setting an appropriate duration for the switch-off-prohibition, especially if a particularly sporty driving behavior of driver is assumed, so that a sufficiently long all-wheel operation of the motor vehicle ensures that a driving situation considered to be relevant, for example critical, can now be safely navigated before the all-wheel drive was switched on.

According to another advantageous embodiment of the invention, a section of a roadway in front of the motor vehicle in the driving direction may be detected by environmental sensors of the motor vehicle and/or by a navigation device of the motor vehicle, and it may then be checked whether the roadway section has a curve with a radius of curvature less than a predetermined radius of curvature, and if this is the case, the all-wheel drive is switched on before driving along the roadway section. In particular, tight curves can be anticipatorily detected, so that the all-wheel drive can be switched on forward-looking, i.e. anticipatorily, by taking this information into consideration, before a relevant driving situation can occur, for example due to unwanted loss of traction, understeer or oversteer. For example, the all-wheel drive is switched on early enough so that the motor vehicle can be safely and quickly accelerated again out of a previously unrecognized curve without causing an unstable driving behavior of the motor vehicle, for example in the form of an understeer or an oversteer. Furthermore, timely switching on the all-wheel drive may also be useful before driving though the curve, since when suddenly taking the foot off the gas pedal, i.e. when quickly changing from a traction operation into towing operation of the motor vehicle, it may be more advantageous to operate the motor vehicle already in all-wheel drive and to not exclusively drive the primary axle.

According to another advantageous embodiment of the invention, the roadway section located below and/or in front of the motor vehicle may be monitored with a detection device of the motor vehicle, in particular with a multi-level laser scanner and a coefficient of friction of the roadway section located below and/or in front of the motor vehicle may be determined on this basis. Changes in the coefficient of friction, for example due to a change from ice-free to an ice-covered road surface and the like, may be identified forward-looking, so that the all-wheel drive can be switched on early and timely to improve the driving behavior of the motor vehicle when taking this information into consideration.

According to another advantageous embodiment of the invention, a future acceleration and/or a future target radius of the motor vehicle may be provided by one or more driver assistance systems of the motor vehicle, and it may then be estimated based on these variables whether a relevant driving situation is imminent, in which case the all-wheel drive is switched on before the relevant situation actually occurs. In particular driver assistance systems of the motor vehicle are used which enable a semi-autonomous or autonomous operation of the motor vehicle, for example in the form of an adaptive cruise control system, a lane tracking assistant and the like, in order to provide future trajectories, accelerations and speeds and perform a forward-looking assessment based on this information as to whether a relevant driving situation can be expected, so that the all-wheel drive can be timely switched on to improve the driving dynamics and to thereby contribute to a safer driving behavior of the motor vehicle.

A system according to the invention for operating a drive train of a motor vehicle includes a detection device which is configured to detect at least one variable quantifying and/or influencing a movement of the motor vehicle and also a controller which is configured to switch on an all-wheel drive of the motor vehicle as a function of the variable, wherein the system according to the invention is characterized in that the controller is configured to estimate based on the at least one variable whether a relevant driving situation is imminent, and to only in this case switch on the all-wheel drive prior to the occurrence of the relevant situation. Advantageous embodiments of the method according to the invention are to be regarded as advantageous embodiments of the system wherein, in particular, the system includes means for carrying out the method steps.

Further advantages, features and details of the invention will become apparent from the following description of a preferred exemplary embodiment and from the drawing. The features and feature combinations mentioned above in the description and the features and feature combinations mentioned below in the description of the figures and/or shown in the figures alone can be used not only in the respective described combination, but also in other combinations or alone, without going beyond the scope of the invention. Embodiments should also be as encompassed and disclosed by the invention which are not explicitly shown and explained in the figures, but which can be inferred or generated by separated combinations of features from the described embodiments.

DETAILED DESCRIPTION OF PREFERRED EMBODIMENTS

Figure 1:
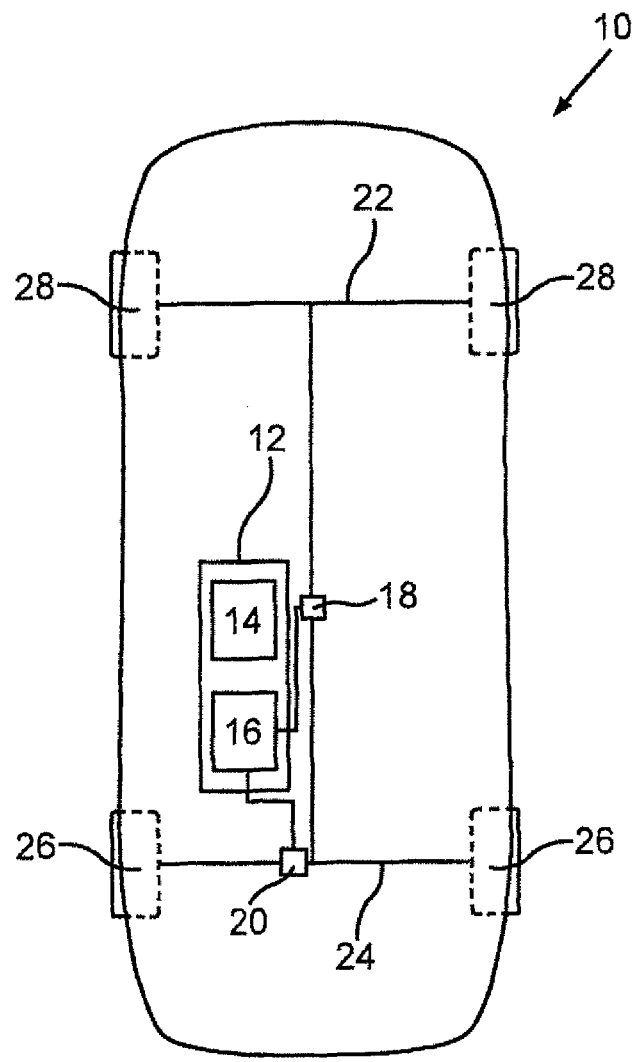
FIG. 1 a schematic diagram of a motor vehicle with a detection device configured to detect a variable quantifying and/or influencing a movement of the motor vehicle and a controller configured to switch on an all-wheel drive of the motor vehicle as a function of the variable.

FIG. 1 shows a motor vehicle 10 with a system 12 for operating an unspecified power train of the motor vehicle 10 in a schematic view. The system 12 includes a detection device 14 which is configured to detect a variable quantifying and/or influencing at least one movement of the motor vehicle 10. Furthermore, the system 12 includes a controller 16 which is configured to switch on or switch off an all-wheel drive of the motor vehicle 10 in accordance with the variable. The controller 16 is coupled to two clutches 18, 20, so that the clutches 18, 20 can be opened or closed by the controller 16 for switching on or switching out the all-wheel-drive.

In the present case, the front axle of the motor vehicle 10 is a permanently driven primary axle 22, and the rear axle of the motor vehicle 10 is a switchable secondary axle 24. However, the motor vehicle 10 may also be a motor vehicle where the rear axle is the primary axle and the front axle can be switched on for an all-wheel drive.

In the present example, the clutch 18 is a multi-plate clutch, with which the secondary axle 24 is switched on and a flow of torque from an unillustrated engine can be variably adjusted between the primary axle 22 and the secondary axle 24. The clutch 20 is in this case a yaw clutch 26, which serves to separate an unillustrated axle drive provided only on the secondary axle 24 operated in all-wheel drive mode from a flow of force between the two rear wheels. This can help eliminate or reduce in an exclusively two-wheel drive of the primary axle 22 corresponding friction and churning losses in the axle drive as well as eliminate or reduce during acceleration additional masses to be accelerated, for example, a ring gear of the axle drive. In other words, a rear drive train is temporarily decoupled in order to reduce losses caused by a stationary propeller shaft in conjunction with a rear axle differential. This is implemented on the output side of the gear by a clutch 18 formed as a multi-plate clutch and on the wheel side (the secondary axle 24) by the clutch 20 constructed as a jaw clutch.

Figure 2:
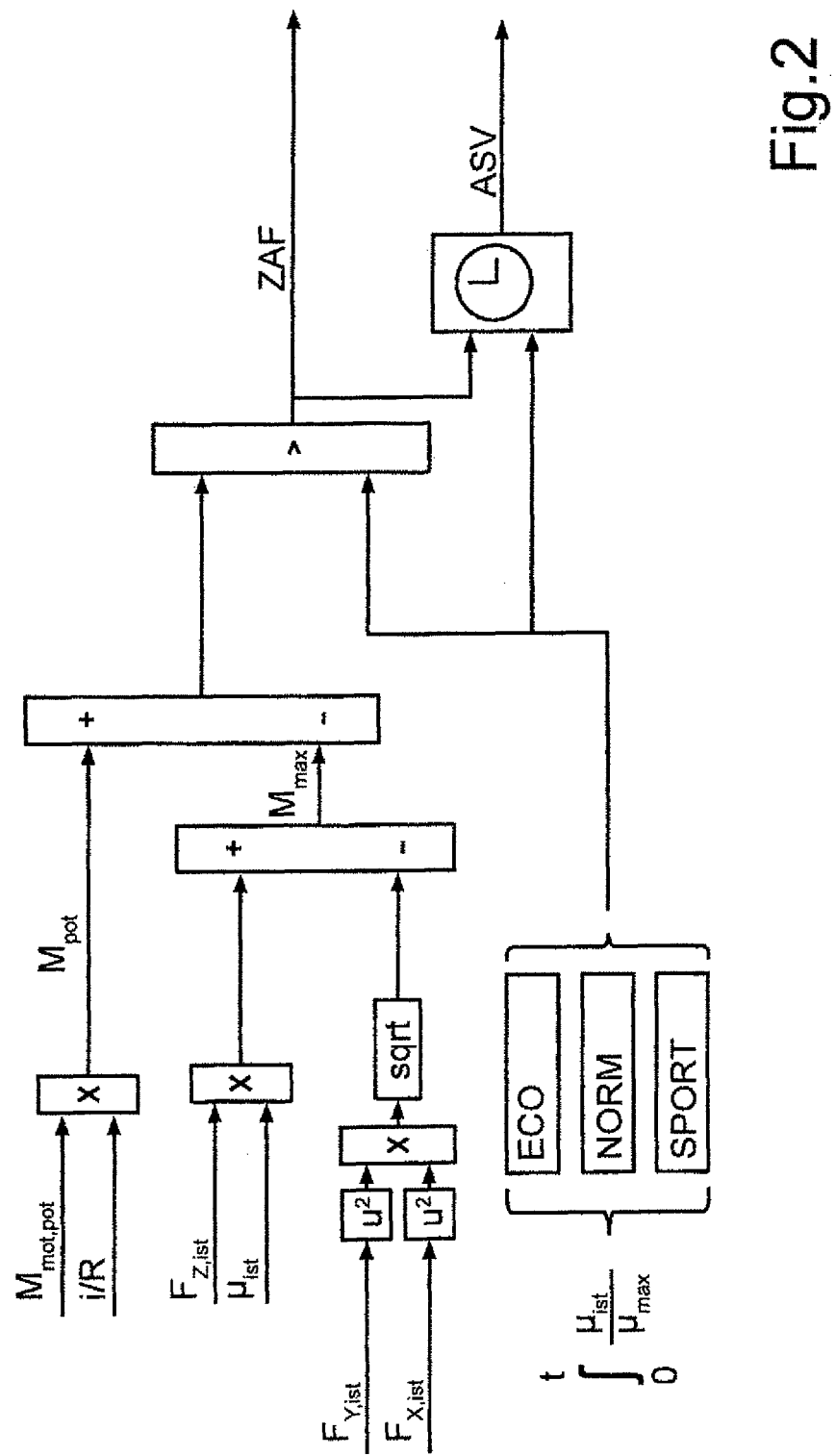
FIG. 2 a signal flow diagram showing a traction pilot control for operating a drive train of a motor vehicle.

Hereinafter, a method for operating the drive train of the motor vehicle 10 will be explained with reference to FIGS. 2 to 5. FIG. 2 shows a signal flow diagram for traction pilot control. The traction pilot control is used to anticipatorily estimate whether one or both front wheels 28 can be expected to spin with a pure two-wheel drive of the motor vehicle 10. On the one hand, a potential engine torque $M_{mot,pot}$ is detected and multiplied by taking into account a corresponding transmission ratio i and a radius R of the front tires 28 in order to determine an available torque $M_{pot}$ at the permanently driven primary axle 22 of the motor vehicle 10. Furthermore, a current wheel load $F_{z,ist}$ is multiplied with a current coefficient of friction $\mu_{ist}$. Furthermore, the lateral forces $F_{y,ist}$ and longitudinal forces $F_{x,ist}$ acting on the respective wheels 28 are reconciled. Based on these variables, a maximum torque $M_{max}$ transferable to the roadway at the primary axle 22 is determined and compared with the previously determined torque $M_{pot}$ available at the primary axle 22. If the available torque $M_{pot}$ is larger than the maximum torque $M_{max}$ transferable to the roadway at the primary axle 22, it is estimated whether a driver is expected to demand a large portion of the available torque $M_{pot}$ such that this portion is greater than the transferable torque $M_{max}$. If this is the case, a switch-in request ZAF occurs.

To estimate the driving behavior of the driver, the driver can be associated with different types of drivers ECO, NORM, SPORT, wherein based on the different association of the driver with the driver types a more economic, a normal or a sporty driving behavior can be assumed. For example, the association of the driver with the driver types can be based on the driver's current driving behavior or based on a continuously refined profile of the driver.

An ongoing refinement of the prediction of the driving behavior of the driver is presently achieved in that the driver continuously analyzes use of a frictional value. For this purpose, the ratio between a current coefficient of friction $\mu_{ist}$ and a maximum coefficient of friction $\mu_{max}$ used by the driver is formed and integrated over time. This continuously monitors both the longitudinal dynamic driving behavior and the transverse dynamic driving behavior of the driver. For example, it can then be determined, how closely a driver usually approaches the limit of the vehicle when driving through curves, how strongly he accelerates the vehicle, etc. The driver is associated with the different types of drivers ECO, NORM, SPORT based on this integral.

The driving behavior of the driver can also be assessed by taking into account an activated mode of operation of the motor vehicle that affects the driving dynamics of the motor vehicle. The motor vehicle 10 may include, for example, a vehicle dynamics system which allows the driver to adapt the characteristics of corresponding components of the motor vehicle 10, for example, the engine characteristics, the transmission characteristics, the steering characteristic, the damping characteristic, and the like, by preselecting a corresponding mode of operation.

A different driving behavior of the driver is assumed depending on the selected mode of operation of the vehicle dynamics system. In addition, the driving behavior of the driver can also be estimated depending on the set mode of operation of the motor vehicle influencing the driving dynamics of the motor vehicle and its current driving behavior and/or a driver profile.

After the switch-in request ZAF has been generated, the controller 16 controls the clutches 18 and 20 such that the secondary axle 24 is switched on, thus enabling an all-wheel operation of the motor vehicle 10. After the all-wheel drive has been switched on, it will be determined based on the at least one variable and additional variables quantifying and/or influencing the movement of the motor vehicle whether switching off the all-wheel drive would result in a relevant driving situation, for example, unwanted oversteer, understeer and the like, and if this is not the case, the all-wheel drive is switched off after a predetermined holding period in the form of a switch-off prohibition ASV. The holding period ASV is hereby predetermined as a function of the respective activated mode of operation influencing the driving dynamics of the motor vehicle and/or of the estimated driving behavior of the driver. A corresponding switch-off delay is thus defined in order to prevent the previously switched-in all-wheel drive from being switched off again immediately or after a very short period of time.

The traction pilot control explained with reference to FIG. 2 is hence used to timely switch on an all-wheel drive of the motor vehicle 10 before a loss of traction of the wheels 28 on the primary axle 22 can occur.

Figure 3:
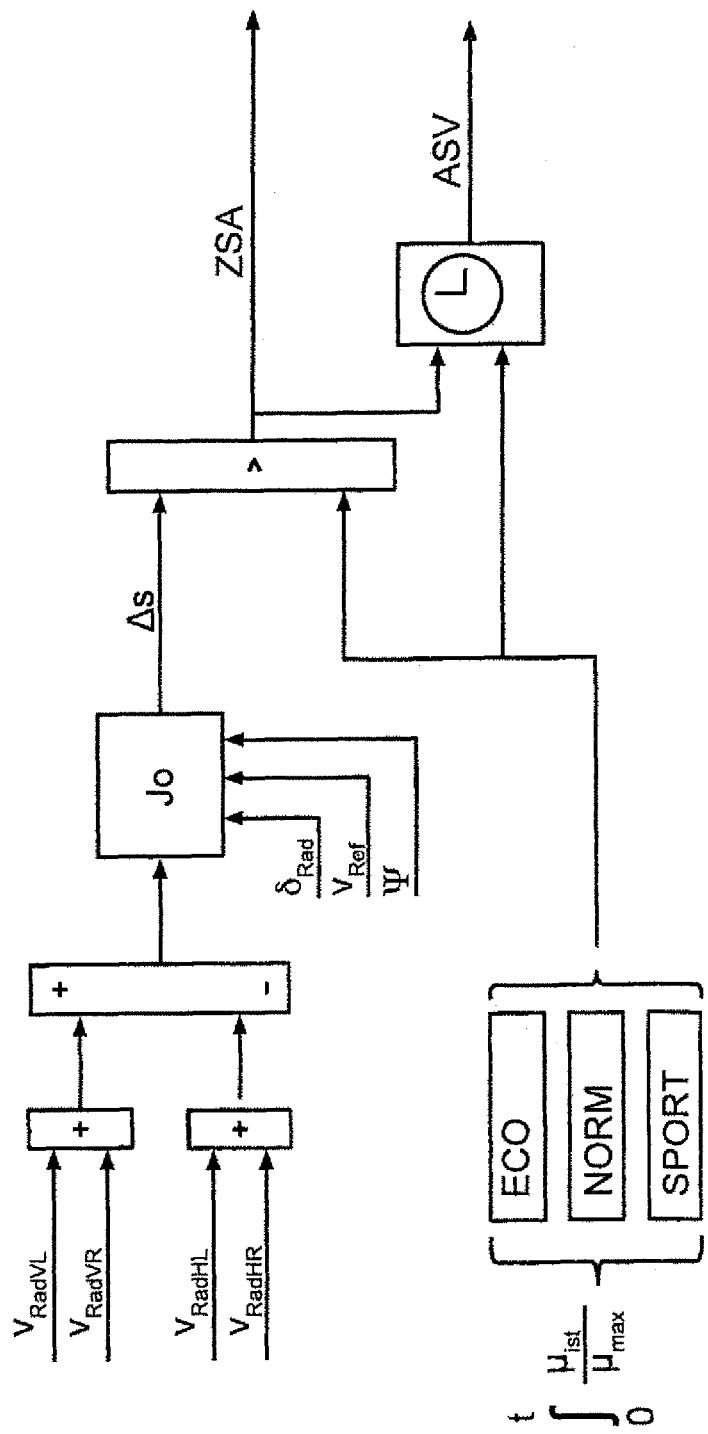
FIG. 3 a signal flow diagram showing a traction control for operating a drive train of a motor vehicle.

FIG. 3 shows another signal flow diagram used for explaining a traction control. Wheel speeds of the left front wheel $V_{RadVL}$, the right front wheel $V_{RadVR}$, the left rear wheel $V_{RadHL}$ and the right rear wheel $V_{RadHR}$ are measured and supplied to a vehicle model 30. Also supplied to the vehicle model 30 is a reference velocity $V_{ref}$, a yaw rate $\dot{\psi}$ and wheel rotation speed difference $\delta_{Rad}$. Based on these values, a corresponding corrected slip $\Delta s$ between the wheels 26, 28 is determined. Furthermore, depending on the currently activated mode of operation influencing the driving dynamics of the motor vehicle, an unspecified threshold value for an additional slip at one wheel or between the wheels 26, 28 is determined and compared with the calculated slip Δs. If the determined slip Δs is less than the predetermined threshold value, the all-wheel drive is switched on. The traction control explained here intervenes exactly in those cases when the traction pilot control explained with reference to FIG. 2 has not contributed in a desirable way to timely switch on the all-wheel drive in order to prevent unwanted slip. For example, this can occur because the driving behavior of the driver had been inadequately assessed in the context of the traction pilot control, so that erroneously a non-relevant situation or not such a situation was expected, where slip on one of the wheels, especially on the primary axle 22 could have occurred. The traction control explained with reference to FIG. 3 is then used to prevent or limit the slip that had already occurred on the primary axle by switching on the secondary axle 24, i.e. an all-wheel drive.

Figure 4:
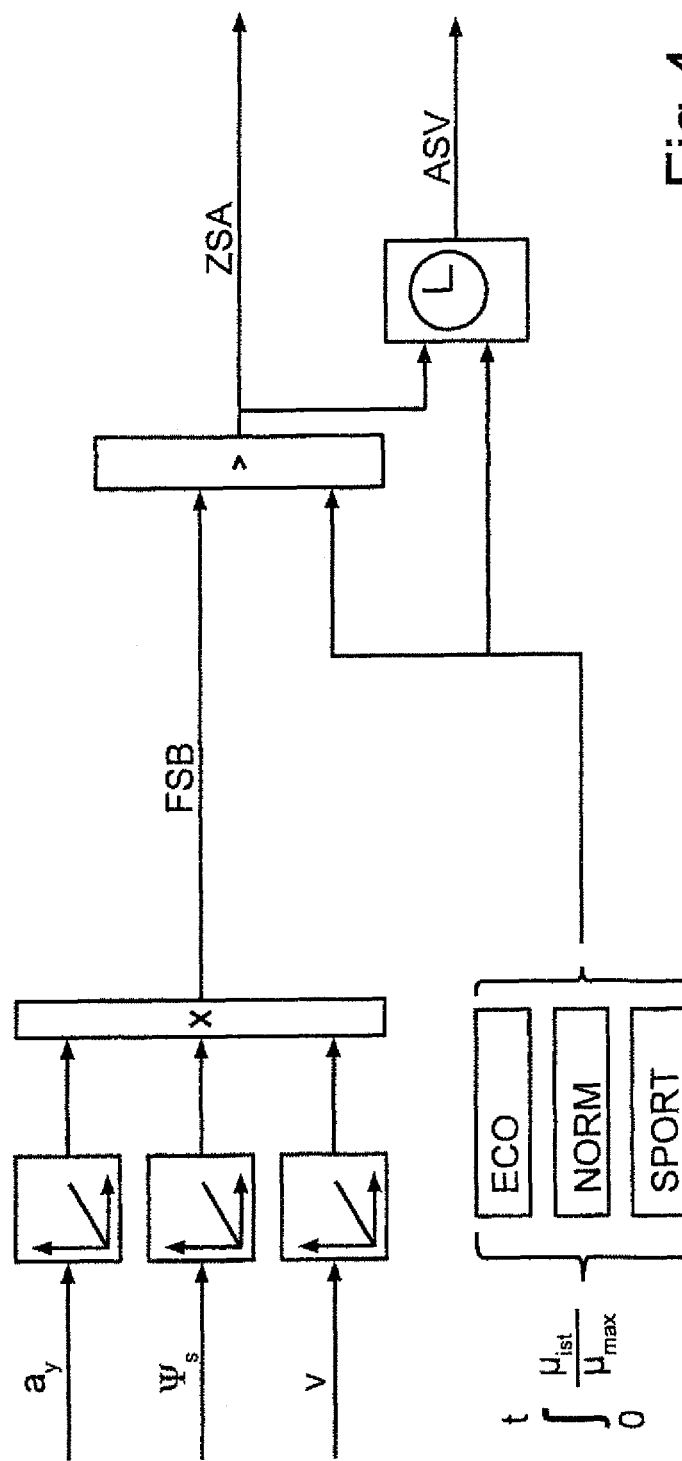
FIG. 4 a signal flow diagram showing a vehicle dynamics pilot control for operating a drive train of a motor vehicle.

FIG. 4 shows a signal flow diagram for explaining a driving dynamics pilot control for operating the drive train of the motor vehicle 10. The driving dynamics pilot control is used to anticipatorily switch on the all-wheel drive of the motor vehicle 10 early enough, in particular with respect to driving situations relevant for the lateral dynamics, so as to prevent, for example, understeer or oversteer of the motor vehicle 10. First, a driving situation assessment FSB is performed based on a lateral acceleration $a_y$, a target yaw rate $\dot{\psi}_s$ and a velocity v of the motor vehicle 10. In parallel, an evaluation of the driver type and an association with a driver type class (e.g. ECO, NORM, sports) are performed. Using this assessment and the current driving situation, it is checked whether to expect a relevant driving situation, and if this is the case, a switch-in request ZSA is in turn generated, wherein as a result the controller 16 then switches on the all-wheel drive.

Figure 5:
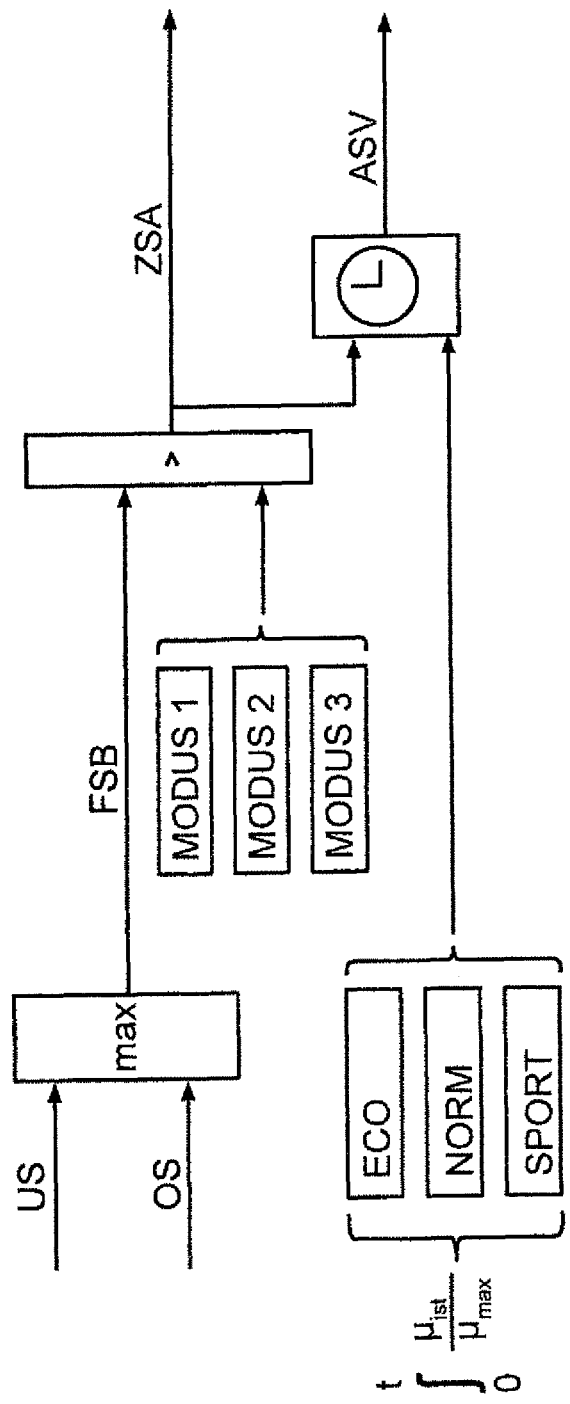
FIG. 5 a further signal flow diagram showing a vehicle dynamics control for operating a drive train of a motor vehicle.

FIG. 5 shows a vehicle dynamics control by way of an additional signal flow diagram, which intervenes in those situations when, due to the dynamics pilot control of FIG. 4, the all-wheel drive is not timely switched on. First, understeer US or oversteer OS of the motor vehicle is determined and a driving situation assessment FSB is performed based on this determination. Depending on a mode of operation MODE 1, MODE 2, MODE 3, which may, for example, correspond to a comfortable, balanced, sports or efficient mode of operation and which can be selected and activated by the driver and influences the driving dynamics of the motor vehicle, a corresponding threshold value for oversteer and understeer of the motor vehicle is set, whereafter this threshold value is compared with the values determined for the understeer US or oversteer OS. If the actual understeer US or oversteer OS exceeds the predetermined limit value, a switch-in request ZSA occurs again, with the controller 16 as a result then switching on the all-wheel drive. Depending on the estimated driving type EGO, NORM, SPORT, a holding period in the form of switch-off prohibition ASV is again specified, which must be exceeded before the all-wheel drive can be switched off again at all.

In particular, for supporting the traction pilot control or driving dynamics pilot control shown in FIGS. 2 and 4, environmental sensors of the motor vehicle and a navigation device of the motor vehicle 10 can detect roadway sections located in the direction of travel in front of the motor vehicle 10 and check, whether the roadway section has a curve with a radius of curvature that is less than a predetermined radius of curvature and, if this is the case, whether the all-wheel drive is switched on before traversing the roadway section. For example, a camera, a photonic mixer device (PMD), position sensitive detector (PST), a laser, radar, and the like can be used to identify in particular tight curves located in the direction of travel in front of the vehicle 10. Furthermore, a corresponding navigation device of the motor vehicle 10 can be used to detect tight curves located in the direction of travel in front of the vehicle 10. When knowing the type of driver and additional variables characterizing the movement of the motor vehicle, such as the current speed of the motor vehicle, its acceleration and the like, identifying tight curves located in the direction of travel in front of the vehicle helps to switch on the all-wheel drive in a particularly timely fashion. The environmental sensors may for example be part of the detection device 14.

The detection device 14 may also include a multi-level laser scanner which monitors roadway sections located below and/or in front of the motor vehicle 10 and determines based thereon a coefficient of friction of the roadway section located below and/or in front of the motor vehicle 10. This helps particularly in the context of the traction pilot control described with reference to FIG. 2 to identify the most current actual values for the coefficient of friction $\mu_{ist}$ so that it can be extremely accurately predicted whether the all-wheel drive should be switched on to prevent loss of traction or spinning of the wheels.

Furthermore, a future acceleration of the motor vehicle 10 and/or a future nominal radius of the motor vehicle 10 can be provided by one or more driver assistance systems and it can be estimated by considering these variables whether a relevant driving situation is imminent, in which case the all-wheel drive is switched on prior to the occurrence of the relevant situation. Depending on the employed driver assistance systems of the motor vehicle, the motor vehicle 10 can be moved with a different degree of automation. For example, the motor vehicle 10 may have an adaptive cruise control that automatically accelerates and slows down the motor vehicle 10. A corresponding desired acceleration or target acceleration $a_x$ of the motor vehicle 10 is then known which can be used to assess the need for switching on an all-wheel drive. In addition, the motor vehicle may have a lane departure warning system, which may be configured, for example, to autonomously steer the motor vehicle 10 in order to keep the motor vehicle 10 inside a lane. Such a lane departure warning system can output and provide respective nominal radii $r_{soll}$, which can also be used to estimate whether the all-wheel drive must be switched on early and anticipatorily to improve the driving dynamics of the motor vehicle 10.

Overall, a switch to an all-wheel drive can timely occur in most cases with the described method and system for operating the drive train of the motor vehicle 10 so that switching on, i.e. the synchronization to the wheel rotation speed and closing of the clutch 20 formed as a yaw clutch can be done comfortably and hardly noticeable for a driver. With the presented method, which is to be understood as an operating strategy for operating the drive train, a control difference, e.g. spinning front wheels during full throttle acceleration or a very rapid cornering, is not required for switching on the secondary axle 24 or an all-wheel drive, respectively. Significant fuel savings can be achieved when using the currently estimated coefficient of friction and the driver type, without having to accept exceedingly high traction losses or losses in the driving dynamics. Furthermore, an anticipatory engagement of the all-wheel drive is improved by using environmental sensors of a driver assistance system. Consequently, the comfort and reliability of switching on or switching off the all-wheel drive can be enhanced.

What is claimed is:

1. A method for operating a drive train of a motor vehicle, comprising the steps of:
   detecting at least one variable quantifying or influencing a movement of the motor vehicle;
   estimating based on the at least one variable whether or not a relevant driving situation is imminent, wherein a relevant driving situation is to be understood as a driving situation where a deviation between an actual driving behavior of the motor vehicle and a driving behavior predetermined by a driver can be expected, or as every situation where a different driving behavior between single-axle operation and all-wheel drive operation discernible by the driver exists;
   detecting with environmental sensors of the motor vehicle or with a navigation device of the motor vehicle a roadway section located in the direction of travel in front of the motor vehicle;
   checking whether the roadway section has a curve with a radius of curvature that is smaller than a predetermined radius of curvature, and
   switching on an all-wheel drive of the motor vehicle as a function of the at least one variable prior to an occurrence of the relevant driving situation and before passing the roadway section.

2. The method of claim 1, further comprising
   for estimating whether the relevant driving situation is imminent, checking whether a torque available on a permanently driven primary axle of the motor vehicle is greater than a maximum torque transferable at the primary axle to the road surface, and
   when this is the case, estimating whether a driver is expected to request a portion of the available torque greater than the transferable torque, and
   when the driver is expected to request such greater portion, switching the all-wheel drive on.

3. The method of claim 2, wherein the maximum torque transferable at the primary axle to the road surface is determined based on a coefficient of friction, a wheel load acting on wheels of the primary axle and a lateral force acting on the wheels of the primary axle.

4. The method of claim 1, wherein the at least one variable comprises a variable selected from a lateral acceleration, a target yaw rate and a velocity of the motor vehicle, the method further comprising
   checking based on the at least one selected variable in combination with an estimated driving behavior of the driver, whether a relevant driving situation can be expected, and
   when this is the case, switching the all-wheel drive on.

5. The method of claim 4, wherein the driving behavior of the driver is estimated by taking into account an activated mode of operation of the motor vehicle that influences a driving dynamics of the motor vehicle.

6. The method of claim 4, wherein the estimated driving behavior of the driver and an actual driving behavior of the driver is continuously compared and used to estimate an overall driving behavior of the driver.

7. The method of claim 5, further comprising
   determining whether a predetermined threshold value for a slip at one of the wheels of the permanently driven primary axle of the motor vehicle is exceeded as a function of the activated mode of operation of the motor vehicle, and
   when this is the case, switching the all-wheel drive on.

8. The method of claim 5, further comprising
   determining whether a predetermined threshold value for an oversteer and understeer of the motor vehicle that depends on the activated mode of operation of the motor vehicle is exceeded, and
   when this is the case, switching the all-wheel drive on.

9. The method of claim 1, further comprising
   after the all-wheel drive is switched on, determining based on the least one variable or additional variables quantifying or influencing the movement of the motor vehicle whether switching off the all-wheel drive would cause a relevant driving situation, and
   when this is not the case, switching the all-wheel drive off after a predetermined holding period.

10. The method of claim 9, wherein the holding period is predetermined as a function of an activated mode of operation that influences the driving dynamics of the motor vehicle or as a function of an estimated driving behavior of the driver, or both.

11. The method of claim 1, further comprising
    monitoring a roadway section located below or in front of the motor vehicle with a detection device of the motor vehicle, and
    determining therefrom a coefficient of friction of the roadway section.

12. The method of claim 11, wherein the detection device is a multi-level laser scanner.

13. A method for operating a drive train of a motor vehicle, comprising the steps of:
    detecting at least one variable quantifying or influencing a movement of the motor vehicle;
    providing with one or more driver assistance systems of the motor vehicle a future acceleration or a future target radius of the motor vehicle,
    estimating based on the at least one variable and the future acceleration or the future target radius whether or not a relevant driving situation is imminent, wherein a relevant driving situation is to be understood as a driving situation where a deviation between an actual driving behavior of the motor vehicle and a driving behavior predetermined by a driver can be expected, or as every situation where a different driving behavior between single-axle operation and all-wheel drive operation discernible by the driver exists, and
    switching on an all-wheel drive of the motor vehicle prior to an occurrence of the relevant driving situation.

14. The method of claim 13, further comprising
    for estimating whether the relevant driving situation is imminent, checking whether a torque available on a permanently driven primary axle of the motor vehicle is greater than a maximum torque transferable at the primary axle to the road surface, and
    when this is the case, estimating whether a driver is expected to request a portion of the available torque greater than the transferable torque, and
    when the driver is expected to request such greater portion, switching the all-wheel drive on.

15. The method of claim 14, wherein the maximum torque transferable at the primary axle to the road surface is determined based on a coefficient of friction, a wheel load acting on wheels of the primary axle and a lateral force acting on the wheels of the primary axle.

16. The method of claim 13, wherein the at least one variable comprises a variable selected from a lateral acceleration, a target yaw rate and a velocity of the motor vehicle, the method further comprising
checking based on the at least one selected variable in combination with an estimated driving behavior of the driver, whether a relevant driving situation can be expected, and
when this is the case, switching the all-wheel drive on.

17. The method of claim 16, wherein the driving behavior of the driver is estimated by taking into account an activated mode of operation of the motor vehicle that influences a driving dynamics of the motor vehicle.

18. The method of claim 16, wherein the estimated driving behavior of the driver and an actual driving behavior of the driver is continuously compared and used to estimate an overall driving behavior of the driver.

19. The method of claim 17, further comprising
determining whether a predetermined threshold value for a slip at one of the wheels of the permanently driven primary axle of the motor vehicle is exceeded as a function of the activated mode of operation of the motor vehicle, and
when this is the case, switching the all-wheel drive on.

20. The method of claim 17, further comprising
determining whether a predetermined threshold value for an oversteer and understeer of the motor vehicle that depends on the activated mode of operation of the motor vehicle is exceeded, and
when this is the case, switching the all-wheel drive on.

21. The method of claim 13, further comprising
after the all-wheel drive is switched on, determining based on the least one variable or additional variables quantifying and/or influencing the movement of the motor vehicle whether switching off the all-wheel drive would cause a relevant driving situation, and
when this is not the case, switching the all-wheel drive off after a predetermined holding period.

22. The method of claim 21, wherein the holding period is predetermined as a function of an activated mode of operation that influences the driving dynamics of the motor vehicle or as a function of an estimated driving behavior of the driver, or both.

23. The method of claim 13, further comprising
monitoring a roadway section located below or in front of the motor vehicle with a detection device of the motor vehicle, and
determining therefrom a coefficient of friction of the roadway section.

24. The method of claim 23, wherein the detection device is a multi-level laser scanner.

25. A system for operating a drive train of a motor vehicle, comprising
a detection device configured to detect at least one variable quantifying or influencing a movement of the motor vehicle;
environmental sensors or a navigation device, or both, wherein the environmental sensors and the navigation device are configured to determine a roadway section located in the direction of travel in front of the motor vehicle, with the roadway section having a curve with a radius of curvature that is smaller than a predetermined radius of curvature; and
a controller configured to
estimate, based on the at least one variable whether a relevant driving situation is imminent, wherein a relevant driving situation is to be understood as a driving situation where a deviation between an actual driving behavior of the motor vehicle and a driving behavior predetermined by a driver can be expected, or as every situation where a different driving behavior between single-axle operation and all-wheel drive operation discernible by the driver exists, and to
switch on an all-wheel drive prior to an occurrence of the relevant driving situation and before passing the roadway section.

26. A system for operating a drive train of a motor vehicle, comprising
a detection device configured to detect at least one variable quantifying or influencing a movement of the motor vehicle;
a controller configured to
estimate, based on the at least one variable and by considering a future acceleration or a future target radius of the motor vehicle provided by one or more driver assistance systems of the motor vehicle, with which a semi-autonomous or an autonomous operation of the motor vehicle is enabled, whether a relevant driving situation is imminent, wherein a relevant driving situation is to be understood as a driving situation where a deviation between an actual driving behavior of the motor vehicle and a driving behavior predetermined by a driver can be expected, or as every situation where a different driving behavior between single-axle operation and all-wheel drive operation discernible by the driver exists, and to
switch on an all-wheel drive of the motor vehicle as a function of the at least one variable and only prior to an occurrence of the relevant driving situation.

* * * * *